United States Patent
Baldemair et al.

(10) Patent No.: US 11,646,846 B2
(45) Date of Patent: May 9, 2023

(54) TRANSIENT PROTECTION INTERVAL

(71) Applicant: TELEFONAKTIEBOLAGET LM ERICSSON (PUBL), Stockholm (SE)

(72) Inventors: Robert Baldemair, Solna (SE); Daniel Larsson, Lund (SE); Erik Dahlman, Stockholm (SE); Stefan Parkvall, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 58 days.

(21) Appl. No.: 16/637,039

(22) PCT Filed: Aug. 9, 2017

(86) PCT No.: PCT/SE2017/050808
§ 371 (c)(1),
(2) Date: Feb. 6, 2020

(87) PCT Pub. No.: WO2019/031997
PCT Pub. Date: Feb. 14, 2019

(65) Prior Publication Data
US 2020/0244418 A1 Jul. 30, 2020

(51) Int. Cl.
*H04L 5/00* (2006.01)
*H04W 72/04* (2009.01)
*H04W 72/0446* (2023.01)

(52) U.S. Cl.
CPC ............ *H04L 5/0053* (2013.01); *H04L 5/001* (2013.01); *H04L 5/0051* (2013.01);
(Continued)

(58) Field of Classification Search
CPC .... H04L 1/1854; H04L 1/1887; H04L 5/0094
See application file for complete search history.

(56) References Cited

U.S. PATENT DOCUMENTS

| 2013/0272229 A1 | 1/2013 | Dinan |
| 2016/0381490 A1 | 12/2016 | Alvarino et al. |

(Continued)

FOREIGN PATENT DOCUMENTS

| CN | 1564555 A | 1/2005 |
| CN | 105191196 A | 12/2015 |
| CN | 105229932 A | 1/2016 |
| GB | 2552689 A | 2/2018 |
| WO | 2017142469 A1 | 8/2017 |

OTHER PUBLICATIONS

Supplementary European Search Report and Written Opinion dated Feb. 12, 2021 for International Application No. 17920839.2, consisting of 14-pages.

(Continued)

*Primary Examiner* — Ayaz R Sheikh
*Assistant Examiner* — Debebe A Asefa
(74) *Attorney, Agent, or Firm* — Christopher & Weisberg, P.A.

(57) ABSTRACT

There is disclosed a method of operating a user equipment in a radio access network. The method comprises transmitting, during a transmission period, first signaling having a first set of transmission characteristics, and second signaling having second set of transmission characteristics, wherein the first set differs from the second set, wherein transmitting comprises including a transient protection interval in time domain between the first signaling and the second signaling. The disclosure also pertains to related devices and methods.

13 Claims, 9 Drawing Sheets

(52) U.S. Cl.
CPC ......... *H04L 5/0094* (2013.01); *H04W 72/042* (2013.01); *H04W 72/0446* (2013.01)

(56) References Cited

U.S. PATENT DOCUMENTS

| 2017/0078833 | A1 | 3/2017 | Oh |
| 2017/0142659 | A1* | 5/2017 | Noh ................. H04W 52/0245 |
| 2017/0164350 | A1 | 6/2017 | Sun et al. |
| 2017/0302419 | A1 | 10/2017 | Liu et al. |
| 2017/0308710 | A1* | 10/2017 | Du ........................ G06F 21/606 |
| 2018/0132264 | A1 | 5/2018 | Jung et al. |
| 2020/0259896 | A1* | 8/2020 | Sachs ................. G07C 9/00174 |

OTHER PUBLICATIONS

3GPP TSG RAN WG1 Meeting #85 R1-164915; Title: Transient period on NR uplink frame structure design; Source Panasonic; Agenda Item: 7.1.4; Document for: Discussion, Decision; Date and Location: May 23-27, 2016, Nanjing, China, consisting of 3-pages.
3GPP TSG RAN WG4#82 Meeting R1-1700445; Title: Further discussion on UL ON/OFF time mask for shortened TTI; Source: ZTE Corporation; Agenda Item: 9.1.2.2.1; Document for: Approval; Date and Location: Feb. 13-17, 2017, Athens, Greece, consisting of 4-pages.
3GPP TSG RAN WG1 Meeting #89 R1-1708086; Title: Discussion on uplink control channel structure in short-duration; Source: Panasonic; Agenda Item: 7.1.3.2.1; Document for: Discussion; Date and Location: May 15-19, 2017, Hangzhou, P.R. China, consisting of 4-pages.
International Search Report/Written Opinion of the International Searching Authority in related/corresponding PCT Application No. PCT/SE2017/050808 dated Jun. 5, 2018.
Chinese Office Action with English Machine Translation dated Aug. 5, 2022 for Patent Application No. 201780095748.6, consisting of 18-pages.
Chinese Office Action with English Machine Translation dated Mar. 18, 2023 for Patent Application No. 201780095748.6, consisting of 10-pages.

* cited by examiner

TRANSIENT PROTECTION INTERVAL

TECHNICAL FIELD

This disclosure pertains to wireless communication technology, in particular in the context of timing of transmissions.

BACKGROUND $5^{th}$ Generation radio access technology/networks (RAT/RAN) provide a high degree of flexibility, including the possibility to transmit short duration signaling. In particular, 3GPP's New Radio (NR) defines several physical channels/signals that can have a short transmission duration, e.g. Short PUCCH (covering 1 or 2 symbols), mini-slots (1 or more symbols), SRS (1 or more symbols, e.g. up to 4 symbols), PRACH preamble (1 or more symbols). Since these channels or signalings are typically independently power controlled, they may generally be transmitted with different powers. At the transition from one physical channel/signaling to another, power changes thus may occur. Also, in some cases transitions in frequency may occur, e.g. for frequency hopping. In such transitions, transmitter behaviour (e.g., oscillator or amplifier behaviour) may produce undesirable transients or signal disturbance. Such transitions may become particularly problematic if they extend into signaling with short transmission duration, which may lead to a significantly increased error rate.

SUMMARY

It is an object of this disclosure to provide approaches allowing improved handling of scenarios in which transients between first and second signalings may occur. The approaches are particularly advantageously implemented in a $5^{th}$ Generation (5G) telecommunication network or 5G radio access technology or network (RAT/RAN), in particular according to 3GPP ($3^{rd}$ Generation Partnership Project, a standardisation organization). A suitable RAN may in particular be a RAN according to NR, for example release 15 or later, or LTE Evolution.

Accordingly, there is disclosed a method of operating a user equipment (or, more generally, a radio node) in a radio access network. The method comprises transmitting, during a transmission period, first signaling having a first set of transmission characteristics, and second signaling having second set of transmission characteristics, wherein the first set differs from the second set. Transmitting comprises including a transient protection interval in time domain between the first signaling and the second signaling.

Moreover, a user equipment (or, more generally, a radio node) for a radio access network is considered. The radio node or user equipment is adapted for transmitting, during a transmission period, first signaling having a first set of transmission characteristics, and second signaling having second set of transmission characteristics, wherein the first set differs from the second set. Transmitting comprises including a transient protection interval in time domain between the first signaling and the second signaling. The radio node or user equipment may comprise, and/or be adapted for utilising, processing circuitry and/or radio circuitry, in particular a transceiver and/or transmitter, for such transmitting. Alternatively, or additionally, it may comprise a transmitting module for such transmitting.

A method of operating a radio node in a radio access network is also proposed. The method comprises configuring a user equipment (or, more generally, a second radio node) with a transient configuration, the transient configuration indicating a transient protection interval to be inserted in time domain between first signaling and second signaling to be transmitted by the user equipment (or second radio node), wherein the first signaling has a first set of transmission characteristics, and the second signaling has a second set of transmission characteristics, wherein the first set differs from the second set.

In addition, there is disclosed a radio node for a radio access network. The radio node is adapted for configuring a user equipment (or second radio node) with a transient configuration. The transient configuration indicates a transient protection interval to be inserted in time domain between first signaling and second signaling to be transmitted by the user equipment (or second radio node), wherein the first signaling has a first set of transmission characteristics, and the second signaling has a second set of transmission characteristics, wherein the first set differs from the second set. The radio node may comprise, and/or be adapted for utilising, processing circuitry and/or radio circuitry, in particular a transceiver and/or transmitter, for such configuring. Alternatively, or additionally, it may comprise a configuring module for such configuring.

The radio node may be a network node. However, in some scenarios, e.g. for sidelink communication, the radio node may be implemented as user equipment.

The first signaling may be scheduled or configured to neighbour, in time, the second signaling. The first signaling may in general precede, and/or be scheduled or configured to precede, the second signaling in time. Generally, the first signaling and the second signaling may be scheduled or configured for transmission, e.g. with the same message or with different messages. In some cases, the transient configuration may be configured with such a message, or with (another) separate message. It may be considered that the transient configuration is configured with control signaling, in particular downlink or sidelink control signaling, e.g. an uplink grant or a sidelink grant. It may be considered that the first signaling and the second signaling are independently power controlled. It may be considered that the first signaling and the second signaling are to be transmitted, or are transmitted, using the same radio circuitry, e.g. the same transmitter or transmitter chain or transceiver. The first signaling and the second signaling may generally be in the same communication direction, e.g. uplink or sidelink. In some variants, they be in different communication directions, e.g. the first signaling may be in uplink and the second signaling in sidelink, or vice versa. Generally, the first signaling may be associated to a first carrier and/or numerology, the second signaling may be associated to a second carrier and/or numerology. First and second carrier, and/or first and second numerology may be the same, or be different. If the first and second carrier are different, they may belong to the same carrier aggregation (in particular, if first and second signaling have the same communication direction). Transmitting the first signaling and/or the second signaling may be based on a timing advance command and/or value, which may be configured, e.g. by a radio node like a network node. Different timing advance values may be used for the first signaling and the second signaling, e.g. a first timing advance value for the first signaling, and a second timing advance value for the second signaling. The timing advance value for the second signaling may be based on the first timing advance value and the transient protection interval, such that e.g. the second timing advance value may be determined to insert the transient protection interval between the first signaling and the second signaling. In some cases, the first and second timing advance values may be equal.

A set of transmission characteristics may comprise one or more parameters and/or characteristics, in particular duration of signaling (e.g., one or more symbol time lengths), and/or signal strength (in particular, transmission strength, e.g. transmission power), and/or bandwidth, and/or frequency, and/or (physical) channel. Two sets may be considered to differ if they differ in at least one parameter and/or characteristic, in particular channel and/or signal strength, or potentially differ at least in signal strength, e.g. if they are independently power controlled or controllable. In some cases, sets of characteristics may be considered to differ from each other if the associated signalings have independently controllable transmission power and/or frequency and/or bandwidth, and thus may potentially differ. The transient protection interval may be useful for such cases with potentially different physical transmission parameters (e.g., power, frequency and/or bandwidth) even if for actual signaling the differences are small or negligible, to avoid unnecessary overhead.

The first signaling may carry and/or represent one or more first transport blocks, each of which may be split up in one or more code blocks. The second signaling may carry and/or represent one or more second transport blocks, which may be different from the first transport block/s, and which may be split up in one or more code blocks. The code blocks of the second signaling may be mapped frequency-first, and/or mapped to one or two symbols of the second signaling.

In some variants, the transient protection interval may be a silent interval or an interval filled with transient signaling, e.g. during transmission and/or or being configured and/or indicated by the configuration as such. A silent interval may be an interval without transmission, e.g. by the user equipment, at least regarding transmission using the radio circuitry like a transmitter or transmitter chain or transceiver used for transmitting the first and second signaling. An interval with transient signaling may comprise signaling, e.g. according to a prescribed and/or predefined and/or configured pattern. Generally, a transient protection interval may comprise different subintervals, which may be of different type. For example, a transient protection interval may comprise one or more silent intervals, and/or one or more intervals filled with transient signaling, e.g. cyclic intervals. There may be considered a transient protection interval comprising a cyclic suffix of the first signaling, e.g. of the last symbol thereof, and/or a cyclic prefix of the second signaling, e.g. of the first symbol thereof, wherein optionally a silent interval may be provided after the suffix and/or before the prefix, as applicable.

In particular, the first set may differ from the second set in at least one of duration of signaling, channel, channel type, transmission and/or allocated (scheduled and/or configured) bandwidth (e.g., measured in number of subcarriers), frequency (e.g. location of subcarrier/s in frequency domain or spectrum), transmission strength (representing signal strength, e.g. at transmission).

In general, it may be considered that the transient protection interval accommodates for circuitry switching time for switching between the first signaling and the second signaling, and/or to comprise or cover such a time, which may be referred to a transient time. The transient protection interval may be determined to cover the circuitry switching time and/or at least 50% or more, 75% or more, or 90% or more of the circuitry switching time. The circuitry switching time, and/or the transient protection interval generally may be configured or configurable, and/or be device dependent, e.g. dependent on the construction of the circuitry/ies of the user equipment. Transmitting the first and second signaling may be based on determining the circuitry switching time and/or the transient protection interval, which may be determined based on the circuitry switching time. Transmitting the first and second signaling may comprise, and/or be based on, and/or be performed after, indicating (e.g., transmitting corresponding information) to the network, e.g. a network node, the circuitry switching time and/or a transient protection interval indication, e.g. based on the circuitry switching time. The circuitry switching time may be determined by the user equipment, e.g. by reading from a memory, or based on self-testing. Configuring the user equipment, e.g. by the network node, may be based on the circuitry switching time, which may for example be considered when determining the transient configuration.

In some variants, the duration of the second signaling may be shorter than the duration of the first signaling, e.g. comprise a lower number of symbols. This may in particular be true if the second signaling is associated to short PUSCH or short PUCCH signaling, or to a mini-slot or reference signaling like SRS.

It may be considered that the transmission period is neighboured, e.g. in time, by two downlink transmission timing structures. In particular, the transmission period may be bordering to such transmission timing structures. The transmission period may be an uplink or sidelink transmission period, e.g. a transmission timing structure or resource structure assigned or scheduled therefor, e.g. an UL or SL slot or subframe.

The transmission period may generally be represented by, and/or be included in, a transmission timing structure, and/or may cross two transmission timing structures, which may be neighbouring in time. A transmission timing structure, e.g. including or representing the transmission period, may in particular may be a slot or subframe.

The second signaling may have a duration covering N symbol time intervals, N being smaller than 7, in particular smaller than 5, or smaller than 3, and/or N being 2 or 1. The second signaling may in particular be associated to a mini-slot, or short TTI signaling, or short data channel signaling, e.g. a short PUSCH, or short control channel signaling, e.g. a short PUCCH, or similar. Alternatively, or additionally, the second signaling may be mapped frequency first, e.g. such that one or more code blocks of a transport block of the second signaling are mapped to subcarriers of a symbol of the second signaling, in particular before a possible rest of code blocks is mapped to one or more different symbols of the second signaling (if available or necessary). Mapping code blocks to symbols may generally depend on the modulation and coding scheme utilised, which may determine how many bits/code blocks may be mapped to a symbol or a resource element.

In some cases, the first and/or second signaling may be reference signaling, e.g. sounding or pilot signaling, e.g. SRS signaling, which may comprise 1, 2, 3 or 4 symbols.

A transient configuration may generally be configured utilising control signaling, for example dedicated signaling or broadcast/multicast. Dedicated signaling may comprise singlecast signaling, e.g. addressed specifically to the user equipment, for example comprise downlink control signaling, in particular DCI signaling, and/or a grant, e.g. a sidelink grant or uplink grant on whether the configuring is performed on sidelink or downlink. Configuring a transient configuration may comprise determining the transient configuration, and/or a transient protection interval, and/or a timing advance value or command. Timing advance command and/or value and transient protection interval may be configured in different messages. Alternatively, or additionally, the transient configuration may indicate a gap interval, which may be determined based on the transient protection interval, and/or adapt a maximum timing advance value based on the transient protection interval. A transient configuration may generally be indicated or configured using one or more messages, which may be on different layers of the radio stack, e.g. physical layer (e.g., DCI) and/or MAC layer and/or RRC/RLC layer. It may be considered that the transient configuration indicates an adapted, e.g. shortened, transmission duration, e.g. for the first and/or second signaling, and/or the transmission period. This may for example be represented by a timing gap. The adapted duration may be determined based on the transient protection interval and/or a timing advance value (which may be assumed, wherein the assumed value may be adapted based on the transient protection interval and/or the adapted transmission duration).

The transient protection interval may be, and/or comprise, a low-level interval, a ramping interval and/or a cyclic interval. Alternatively, or additionally, transient signaling of the transient protection interval may be associated to a third set of transmission characteristics at least partly corresponding to the second set, e.g. in one or more parameters like signal strength and/or bandwidth and/or frequency. Such intervals may be considered examples of intervals comprising transient signaling. Accordingly, the transient protection interval may be associated to and/or comprise signaling (transmitted by the UE, e.g. using the same radio circuitry/transmitter chain as for the first and/or second signaling), e.g. according to a specific pattern. A low-level interval may comprise signaling at a transmission power and/or signal strength lower than the transmission power or signal strength of the first signaling and/or the second signaling, e.g. at least 50% or lower thereof, or 25% or lower thereof. A ramping interval may comprise signaling at a signal strength/transmission power ramping up or down from the strength or power of the first signaling to the strength or power of the second signaling. A cyclic interval may comprise a cyclic prefix (e.g., for the second signaling) and/or a cyclic suffix, e.g., based on the second signaling and/or the first signaling.

It may generally be considered that the transient protection interval is represented in terms of absolute time, e.g. ms or microseconds, or in terms of symbol time length, or multiples or fractions thereof, e.g. dependent on numerology. In some variants, the transient protection interval may be indicated and/or represent by different timing advance values for the first signaling and the second signaling. The difference in time may be considered the transient protection interval. Such timing advance values may be indicated in a transient configuration.

Generally, transmitting the first signaling and the second signaling may comprise transmitting third signaling or even more signalings. Between each signalings next to each other in time, a (different, or the same in duration) transient protection interval may be inserted. At least the second signaling and the third signaling or further signaling/s, and optionally the first signaling, may be short in time, e.g. 3 or fewer symbols. Different signalings may have different durations (number of symbols/symbol time intervals), or the some or all may have the same duration (length of time interval, e.g. in number of symbols). Alternatively or additionally, the second signaling and/or third or further signaling may be mapped frequency first.

It may in general be considered that the transient protection interval is determined based on a distance between the user equipment (or second radio node) and the radio node or network node. For example, whether a transient protection interval is to be inserted may be based on whether the distance is above a certain threshold or not, and/or whether it is within a range, e.g. a cell range or communication range. In some variants, the interval may be inserted if the distance is below the threshold. Alternatively, or additionally, the interval may be inserted for a small cell (e.g., in terms of aforementioned distance, and/or based on network setup). The transient configuration may indicate the distance, and/or the correspondingly determined transient protection interval, and/or be determined based on the distance and/or network setup and/or whether the cell is a small cell or not, and/or the indicated transient protection interval may be determined based on the distance and/or network setup and/or cell type (e.g., small cell or not). Generally, the transient configuration, and/or the transient protection interval may be determined based on a timing advance value and/or range of a cell or communication link, which may generally be related to, and/or dependent on, a timing advance value, in particular a maximum timing advance value. Configuring a radio node like a UE with a transient configuration may comprise determining a timing advance value, e.g. based on and/or considering a transient protection interval, and/or configuring a user equipment or second radio with such. Alternatively, or additionally, determining a transient configuration may comprise adapting a timing advance value or command to a transient protection interval.

Alternatively, or additionally, it may be considered that the transient protection interval is determined and/or configured based on the duration (e.g., in time and/or symbol time intervals) of the second signaling (or third or further signaling), and/or whether the signaling is frequency-first mapped or not. For example, no transient protection period may be inserted if the signaling is not frequency first-mapped, and/or is longer than a threshold duration, e.g. M symbol time intervals, e.g. 4 or more symbols. In some variants, the transient protection interval may be determined and/or configured, e.g. additionally or alternatively, based on a modulation and coding scheme (MCS) to be used for the second (or third or further) signaling. For example, if the MCS indicates a low number of bits per symbol, e.g. QAM16 or lower, code blocks may spread out in time, e.g. even for frequency-first mapping. In such cases, a transient protection interval may in some scenarios be omitted.

It may generally be considered that transmitting the first signaling and/or second signaling, and/or the transient protection interval based on a configuration, in particular a transient configuration. The transient configuration may schedule the first and/or second signaling. In some scenarios, the transient protection interval may be indicated and/represented by, and/or based on, the first and second signaling being scheduled (e.g., by the transient configuration) with one or more symbol time intervals (e.g., integer number of symbols) between them, such that they are scheduled to not being directly neighboured in time, in particular in a symbol time interval based time grid defined by transmission timing structures. Scheduling may generally be considered to refer to symbols in such a grid, which may be considered quantifying the time structure. In some variants, the transient protection interval may be considered to be configurable independent of such grid, and/or to be shifting the grid, and/or be considered to be represented and/or configured or configurable to be factorizable or representable with a real-valued (and/or non-integer) factor or multiple of a symbol time interval duration. The transient protection interval may generally be considered to be represent a length or a duration of the time interval, which may be localised or localizable in time domain between the first and second signaling.

There is also described a program product comprising instructions causing processing circuitry to control and/or perform a method as disclosed herein.

Moreover, a carrier medium arrangement is suggested, the carrier medium arrangement carrying and/or storing a program product as described herein.

The approaches described herein allow accommodating for transients appearing when going over (e.g., switching) from one type of signaling (the first signaling, whose type may be considered to be determined by the first set), to second signaling (whose type may be considered to be determined by the second set). The approaches in particular allow distributing, in frequency domain, code blocks of the same transport block in the same symbol time interval (analogously to frequency-first distribution), in particular of second signaling, with limited chance that a transient impairs their transmission and thus impairs transmission of the whole transport block.

BRIEF DESCRIPTION OF THE DRAWINGS

The drawings are provided to illustrate concepts and approaches described herein, and are not intended to limit their scope. The drawings comprise.

DETAILED DESCRIPTION

Figure 1:
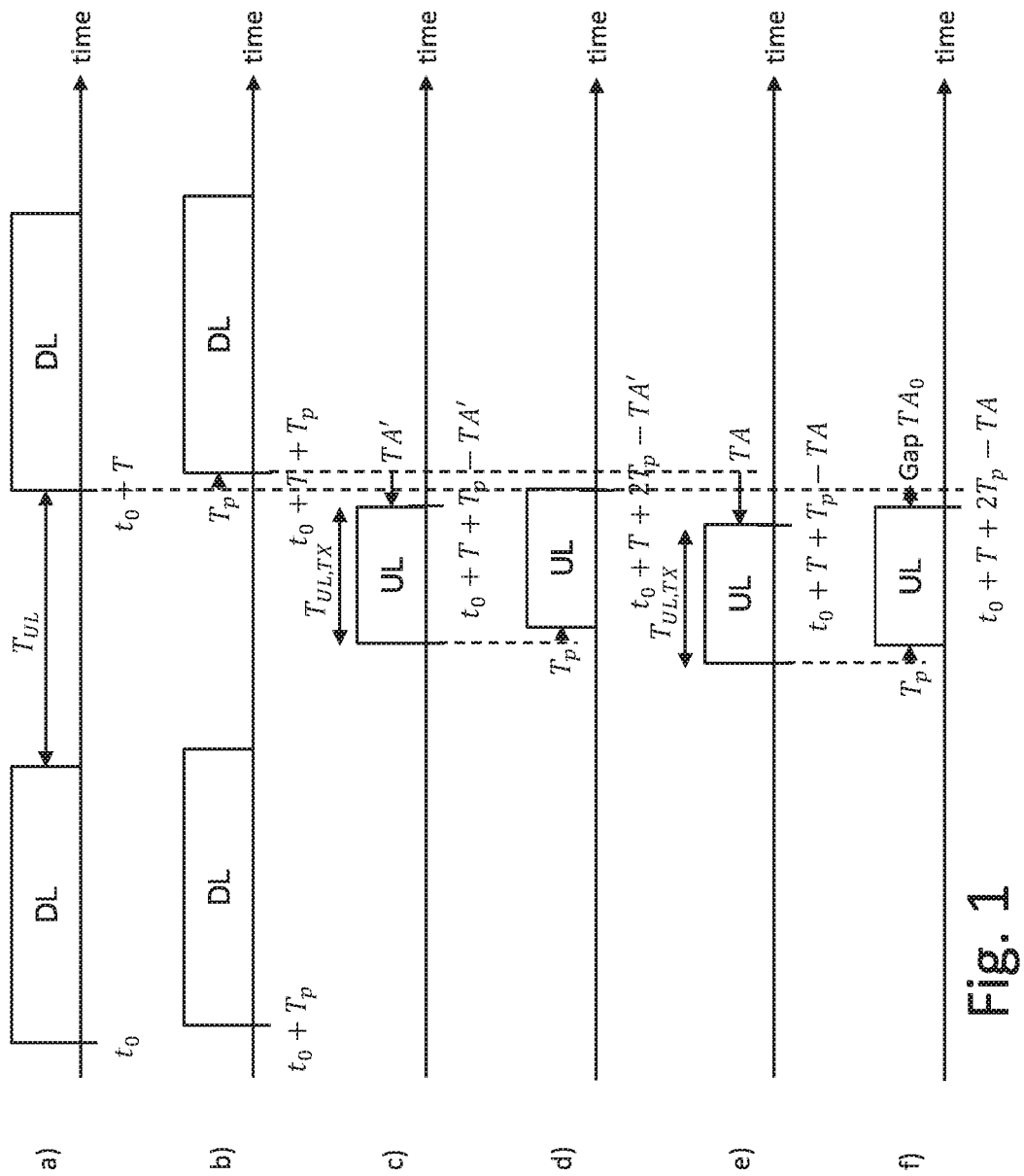
FIG. 1, showing exemplary transmission timing scenarios.

The following description focuses by way of example a NR RAN, respectively OFDMA/SC-FDMA transmission. However, the approaches may be applicable to other systems as well. The examples assume communication between a network node and a user equipment (UE). However, the communication can be between any kind of radio nodes, e.g. between two UEs or two network nodes, e.g. in sidelink or backhaul communication.

Transients may in particular be problematic if a transport block is segmented into multiple code blocks, e.g. if the transport block size exceeds a maximum code block size. The code block may be distributed time-first, e.g. across multiple OFDM symbols (in fact, for reasonable code block sizes, a code block may be distributed to all OFDM symbols in a slot/subframe). Code blocks of different transport blocks may be distributed accordingly, such that for example one OFDM-symbol (symbol time interval) may comprise code blocks associated to a plurality of transport blocks. Such time-first mapping provides robustness to time-localized impairments. If, e.g., one OFDM symbol is impaired, all code blocks mapped thereon are impacted a bit, but are unimpaired on the other OFDM symbols they are mapped to. Since error correction may be done per code block, it is better to impair each code block a bit (leaving a good chance that error correction may be successful) than one code block a lot, since failure in a single code block may result in lost transport block reception. Drawback of time-first mapping is increased latency: On the transmitter side (almost) all code blocks need to be encoded to construct the first OFDM symbol, increasing the time delay between uplink grant reception and uplink data transmission. On the receiver side, decoding can only start after the last OFDM symbol has been received since (almost) all code blocks are mapped to all OFDM symbols.

In frequency-first mapping, a code block is first mapped to the available resource elements within an OFDM symbol, and only if the code block does not fit into one OFDM symbol, it is mapped to multiple OFDM symbols. For high data rates, a code block is typically confined to a single OFDM symbol (even multiple code blocks can fit into a wide bandwidth), and only at bandwidth edges a code block stretches across two OFDM symbols. At the transmitter, only one or few code blocks need to be encoded prior transmitting the first OFDM symbol. At the receiver side, decoding can start after the OFDM symbol(s) containing the first code block has been received. A time-localized impairment can heavily impair a single code block, which can make it impossible to successfully decode the code block resulting in a lost transport block.

NR defines several signaling types, e.g. associated to physical channels/signals, that can have a short transmission duration, e.g. Short PUCCH (1 or 2 symbols), mini-slots (1 or more symbols), SRS (1 or more symbols), PRACH preamble (1 or more symbols), which may be considered examples of short signaling or second signaling as described herein. Such signaling may be scheduled/transmitted in a transmission period also comprising other signaling, which may be of one of those types, or of other, e.g., longer, types, and may be earlier in time and/or be considered first signaling. The transmission period may in particular represent, or include, a transmission timing structure (also sometimes referred to as transmission timing interval) like a slot or subframe.

Since these channels (of second signaling) are typically independently power controlled (in particular, independent of first signaling), they generally may be transmitted with variable and/or different power. Accordingly, at the transition from one physical channel/signal to another, from first signaling to second signaling, a power change may occur. Transmitting the first signaling and the second signaling may generally comprise controlling such a power change, e.g. by independently controlling the power of the first signaling from the power of the second signaling and/or vice versa, and/or by independently controlling both powers separately. A power change may be significant, e.g. at least 10%, at least 20%, or at least 50% of the power of the first signaling, e.g. increase or decrease. Such power change may be based on one or more configurations, e.g. in different (e.g., independent or separate) power control processes or loops, wherein a first process or loop may be associated to the first signaling and/or a second process or loop may be associated to the second signaling.

Power amplifiers (PA) of radio circuitry (e.g., a transmitter chain) cannot infinitely fast change their power levels, e.g. change from one power level to another, or switch on/off. Instead of an intermediate power level switch, the PA output power gradually approaches the target power level. The majority of this power changes happens within a so called transient time (also referred to as circuitry switching time). The gradient of power changes is typically not specified, and can not easily be determined by a receiver. Furthermore, the phase of the output signal may change during the transient time. For NR, transient times in the order of 10 μs for <6 GHz and 5 μs for above 6 GHz may be considered.

A similar problem can occur if the frequency allocation changes, for example the total allocated bandwidth and/or the location of the allocated bandwidth (e.g., represented by the number of subcarriers, and/or location of the subcarriers in frequency domain). One example in which such may occur comprises frequency-hopping between signalings or signaling components. If the hopping happens within a configured UE bandwidth, the transient time may be short, but can still be larger than zero, if e.g. the UE needs to switch filter and/or needs to reduce power to fulfill out-of-band-emission after the frequency-hop, and/or has to adapted its oscillator. If the frequency-hopping is done outside the UE configured bandwidth, the UE may have to retune its local oscillator which may also results in a—typically longer—transient time.

If a UE transmits one physical channel/signal and during the transmission duration another physical channel/signals is activated, the total output power changes if not the power of the first signal is reduced (which is undesirable). Therefore, also in this case transients, can occur. The same applies if a UE transmits multiple physical channels/signals and one or more signals are stopped earlier than another signal.

An OFDMA-based communication system requires that all received transmissions (e.g., at a network node) are aligned in time, otherwise the orthogonality between subcarriers of OFDM is lost.

From a transmission time $t_0$ (considered the transmitter timing) of signaling from a transmitter, e.g. downlink signaling from a network node (e.g., eNB or gNB), the signaling travels for $T_v=d/c$ seconds (d representing the distance between transmitter and receiver, e.g. the distance between gNB and UE, c is the speed of light in vacuum), as illustrated in the first and second rows in FIG. 1.

If the receiver (the UE) would send its uplink signaling (e.g., first or second signaling, or other signaling) based on this timing, it would reach the network node with a timing offset (late) by $T_{RTT}=2d/c$ (round trip time) relative to the timing of the network node (transmitter timing). Signals transmitted from UEs located at different distances from the transmitter/network node could arrive at different times and orthogonality is lost.

Therefore, each UE is instructed to advance its transmission timing using a timing advance (TA) command indicating a timing advance value, which may be considered to represent a timing offset. If the timing advance command, respectively the TA value, is set to TA'=2d/c, the uplink signal arrives exactly at the UL-DL switching point, as illustrated in the medium two rows in FIG. 1. A realistic radio node (e.g., the network node) cannot instantaneously switch from reception (e.g., of uplink signaling) to transmission (e.g., of downlink signaling), or vice versa. Therefore, a UE may be configured with a slightly larger timing advance than the round trip time 2d/c, TA=2d/c+TA$_0$, wherein TA$_0$ is the time the uplink should end prior the downlink starts (or vice versa; this may accommodate the switching in the radio node). This is illustrated in the last two rows in FIG. 1.

In particular, FIG. 1 shows exemplary a) downlink transmit timing at the network node; b) downlink receive timing at UE; c) uplink transmit timing at UE with timing advance matching round trip time; d) uplink receive timing at network node with timing advance matching round trip time; e) uplink transmit timing at UE with timing advance slightly larger than round trip time; f) Uplink receive timing at network node with timing advance slightly larger than round trip time.

The UE (receiver) may also need a guard time from downlink reception to uplink transmission. This time is denoted $T_{DL \rightarrow UL}$ in FIG. 2. A maximum possible timing advance can be calculated as $TA_{max}=T_{UL}-T_{UL,TX}-T_{DL \rightarrow UL}$ with $T_{UL}$ and $T_{UL,TX}$ being the length of the uplink period and the duration of the actual uplink transmission, respectively.

Figure 2:
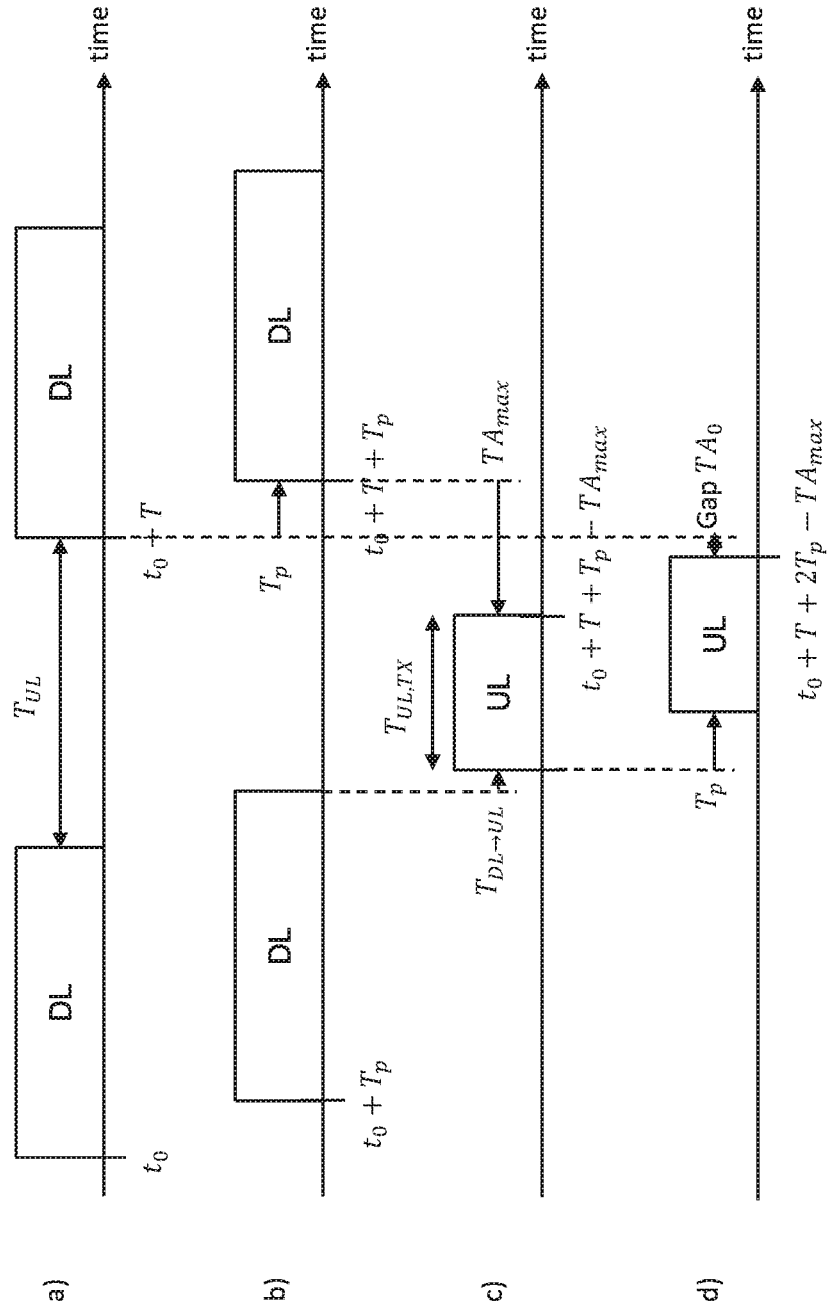
FIG. 2, showing advanced exemplary transmission timing scenarios.

In particular, FIG. 2 show a) downlink transmit timing at the network node; b) downlink receive timing at the UE; c) uplink transmit timing at UE with maximum possible timing advance; d) uplink receive timing at the network node.

To "make space" for the timing advance and the required guard period at DL→UL switch (UE) and UL→DL switch (at the network node) the duration of the actual uplink transmission $T_{UL,TX}$ may typically be shorter by an integer number of symbol duration. The smallest possible difference is $T_{UL}-T_{UL,TX}=n \cdot T_{OFDM}$ with n=1, and $T_{OFDM}$ the OFDM symbol duration (symbol time interval or length), which may include a cyclic prefix. NR supports mixed numerology transmission, e.g. with different numerologies used between uplink and downlink, so in principle it could be envisioned that the uplink transmission consists of OFDM symbols with different symbol durations than downlink transmission. In one exemplary scenario, one symbol in the uplink transmission may be replaced by two OFDM symbols of half nominal symbol duration. One of the half symbols could then be used for transmission, while the other half symbol is not transmitted to create the required guard period for timing advance and switching times.

With the minimum $T_{UL}-T_{UL,TX}=T_{OFDM}$, the maximum timing advance becomes $TA_{max}=T_{OFDM}-T_{DL \rightarrow UL}$, or equivalently the maximum supported distance between transmitter and receiver (e.g., network node and UE) may be $d_{max}=c/2 \cdot (T_{OFDM}-T_{DL \rightarrow UL}-TA_0)$. For larger distances, a single empty OFDM may be too short. Instead n OFDM symbols may be left empty; with n empty OFDM symbols, the maximum distance becomes $d_{max}=c/2 \cdot (n \cdot T_{OFDM}-T_{DL \rightarrow UL}-TA_0)$. This formula may be generalized such that the guard period is created by (a mixture of) empty OFDM symbols of different durations, e.g. depending on numerology. During a transient time, a channel estimate obtained from reference signals may be invalid or unreliable. A receiver cannot (or at most very little) utilize information contained in a transient period. If a code block is transmitted during a transient period, decoding of that code block will often fail (at least if the transient overlaps with the code block more than a threshold), and thus also decoding of the associated transport block will fail. This reduces throughput and increases delay.

There may be considered feedback signaling, e.g. acknowledgement signaling or HARD signaling, per code block group (CBG), e.g. per code block group HARQ feedback. In this context, decoding success/failure may be signaled to the transmitter per group of code blocks. However, operation with such overhead may be undesirable, or supplemented by approaches to improve code block decoding, for example the approaches pertaining to a transient protection interval as described herein.

In particular if a transient time overlaps a short transmission, (e.g. 1 or 2 symbols), a substantial part of the transmission may be disturbed, and decoding/demodulation performance will be poor. In NR, multiple transmissions or signalings (e.g. multiple physical channels/signals) with short transmission durations can follow each other, and/or at least one may be adjacent or neighbouring to a long(er) signaling, e.g. to a frequency-first mapped data channel, and/or a PUSCH or long PUSCH signaling. Such transmission or signaling may be located (in time domain) in one slot, or across two neighbouring slots. In particular short signalings may be very sensitive to transient periods (or in general, time localized disturbances), and may occur next after each other, e.g., neighbouring in time.

Generally, there may be considered to insert a transient protection interval (e.g., a guard period) in time between different signalings (e.g., different physical channels/signals), in particular neighbouring signalings (o scheduled to be neighbouring), wherein the later (second) signaling may be short (e.g., 3 or fewer symbols time intervals). This may be considered at least for some combinations for which the transient time cannot overlap with the beginning/end of any of the adjacent signalings, e.g. physical channels/signals. The transient protection interval may be considered in the context of one or more timing advance values for the associated signalings.

A transient protection interval may generally be considered silent if no signaling (in particular, modulated signaling) is intended/transmitted therein (by the node transmitting the first and second signaling). Such a transient protection interval may also be referred to as empty interval, or as guard period.

Instead of, or in addition to, a guard period (a time interval without modulated signals in time-domain, however, power tails from preceding/subsequent transmissions may be present), other intervals may be considered, e.g. a cyclic interval, which may comprise an extended cyclic prefix of the next symbol, a cyclic suffix of the previous symbol, a mixture of cyclic prefix and suffix. Alternatively, or additionally, a known and/or configured and/or predefined signal/signaling pattern may be considered to fill the transient protection interval.

For small cells with small timing advance (and many short transmissions may be link budget limited to small cells), this extra guard period (or more generally, transient protection interval) does not incur overhead, since it just eats from the extra timing advance budget, which is not used for small cells (or more generally, for small distances between transmitter and receiver). For larger cells or distances, though, where larger timing advance is needed, the uplink transmission duration $T_{UL,TX}$ may have to be reduced by one or more symbols (alternatively the gap $T_{UL}$ can be increased by omitting one or more downlink symbols).

Thus, the network node (or generally, a radio configuring another) may be adapted for operation considering 1) determining required transient protection interval/s between transmissions, and/or 2) determining required timing advance, and/or 3) determining a required difference between gap in downlink and uplink transmission duration, in particular $T_{UL}-T_{UL,TX}$, and/or 4) signaling to the UE gap length and/or uplink transmission duration, respectively configuring it accordingly. One or more of these steps may be included in configuring a radio node with a transient configuration.

According to the approaches described herein, transient periods can occur (at least partly) outside the actual transmission duration of signaling, e.g. on physical channels/signals, which improves performance. This may be particularly useful for short duration transmissions and/or signaling or physical channels that are mapped frequency-first.

Figure 3:
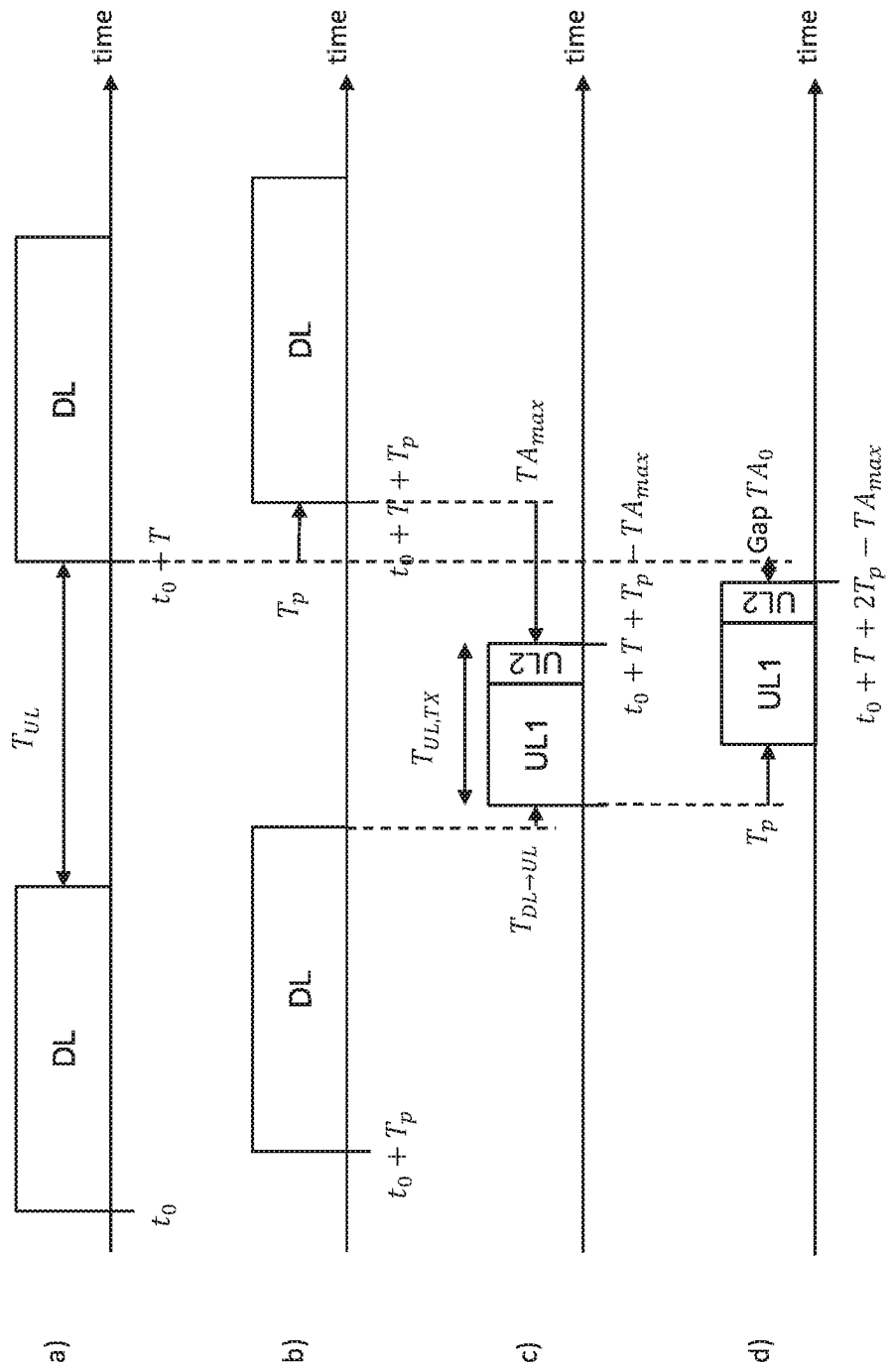
FIG. 3, showing even more advanced exemplary transmission timing scenarios.

FIG. 3 shows uplink transmission containing two parts, the first part representing a first signaling and the second part a second signaling. The two parts have different sets of characteristics (e.g. transmit power, bandwidth, bandwidth allocation), leading to transient times at the transition point. In particular, the signal does not instantaneously change from first part to second part. Examples of first and second part/signalings comprise PUSCH, long PUCCH or mini-slot for the first part/signaling, and short PUCCH, SRS, mini-slot for the second part/signaling.

In particular, FIG. 3 shows that the uplink transmission (e.g., in a slot) contains two physical channels/signals, respectively first signaling UL1 and second signaling UL2.

Figure 4:
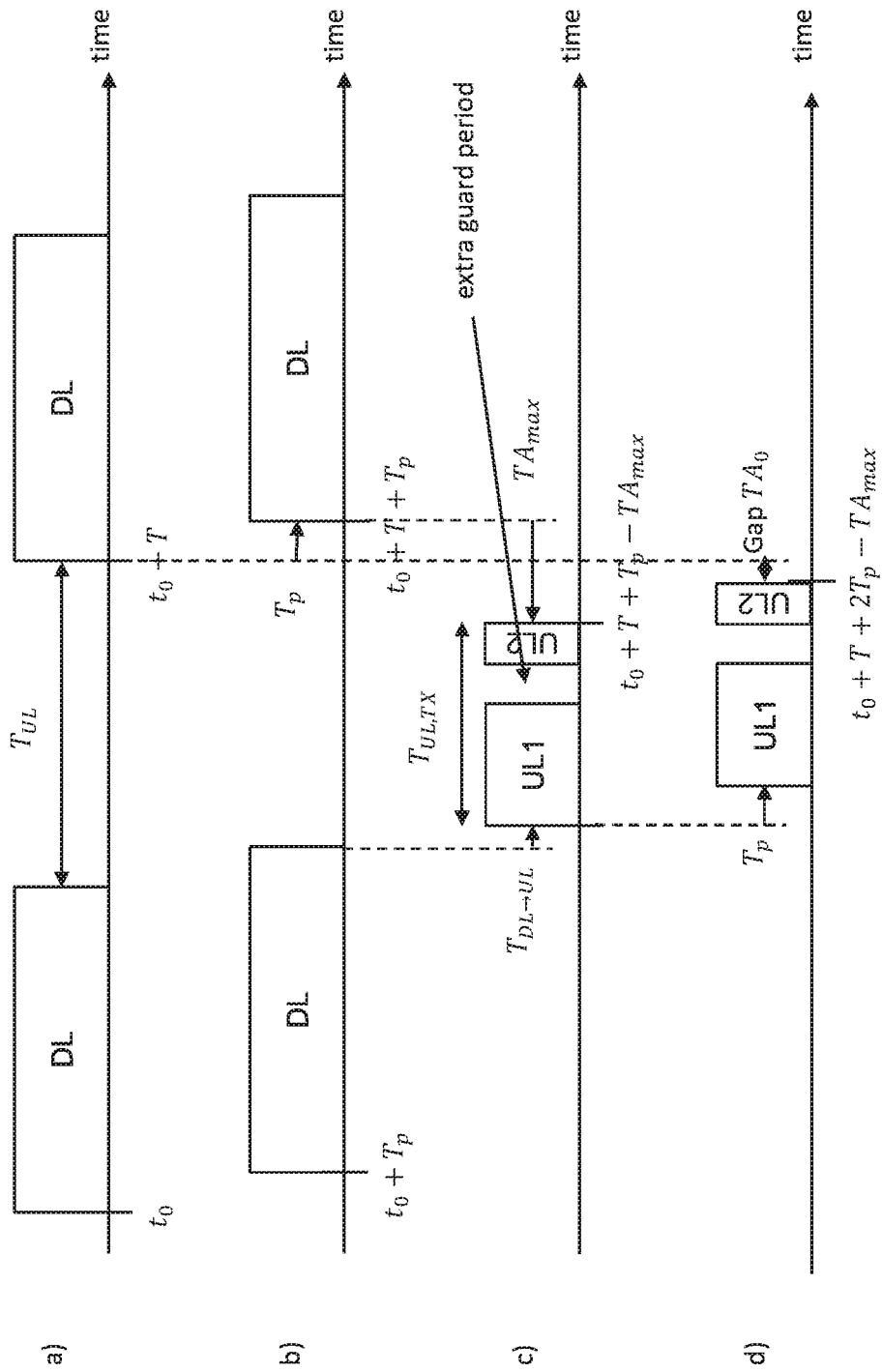
FIG. 4, showing exemplary transmission timing scenarios including an extra guard period representing a transient protection interval.

An extra guard period, or more generally a transient protection interval, may be inserted between the two parts, as shown in FIG. 4. As can be seen when comparing FIGS. 3 and 4, the maximum timing advance $TA_{max}$ is now smaller. However, as long as the required timing advance is smaller than $TA_{max}$ of FIG. 4, no additional overhead occurs. To support the same $TA_{max}$ as in FIG. 3, either the downlink gap duration $T_{UL}$ or the uplink transmit duration $T_{UL,TX}$ needs to be shortened, and/or configured accordingly.

Figure 5:
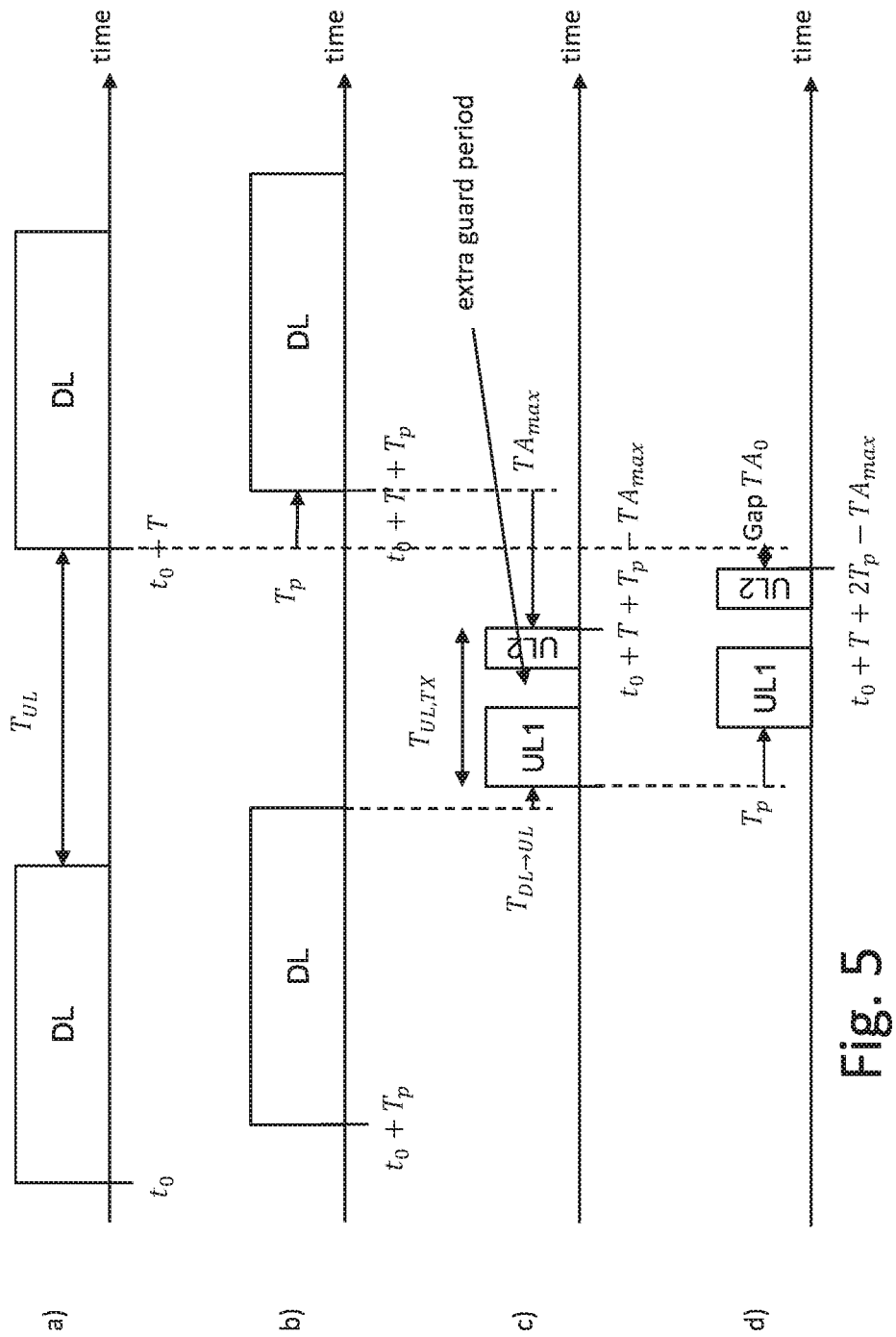
FIG. 5, showing another exemplary transmission timing scenarios including an extra guard period.

In FIG. 5, the uplink transmission is shortened and now the same timing advance as in FIG. 3 is supported, at the cost of higher overhead for the corresponding configuration.

In particular, FIG. 4 shows an extra guard period inserted between uplink transmissions UL1 and UL2. FIG. 5 shows an extra guard period inserted between uplink transmissions UL1 and UL2. To support the same timing advance (cell size) as in FIG. 3, UL1 is shortened. The transient configuration may be determined and/or configured accordingly.

It should be noted that the network node (or more generally, a radio node) may be considered to be adapted for operating, and/or may be considered to operate, based on the transient configuration it determines, even if the configuration may be for configuring another node. Different transient configurations may be determined and/or configured for different UEs (or second radio nodes).

If a UE has uplink transmissions UL1 and UL2 that require an extra guard period in-between, the network or network node could configure/signal the extra guard period (a transient protection interval) between UL1 and UL2 to the UE. This could in principal be done dynamically, e.g. with downlink control signaling. However, the UE may be configured to insert such an extra guard period or transient protection interval between UL1 and UL2 whenever the UE is to transmit a signal combination UL1 and UL2 that may be considered, e.g. predetermined or configured, to requires an extra guard period or a transient protection interval in between. As stated earlier, OFDMA requires synchronized uplink transmissions. It is therefore usually considered the responsibility of the network to ensure that concurrent uplink transmissions from different UEs which the network wants time-aligned use the same timing structure. A second UE transmitting just UL1 (or UL2) would not need such an extra guard period, however, to maintain orthogonality with the first UE transmitting UL1 and UL2, even the second UE may use a timing structure with extra guard period. In this case, it could be considered that even a UE transmitting only UL1 (or UL2) should use the timing structure with extra guard period. For example, a UE could be configured with a transient configuration indicating multiple timing structures and/or transient protection intervals (which may also include an interval of 0 length, representing no transient protection interval to be inserted). In a simple case, the configuration may indicate two timing structures: one with extra guard period and one without extra guard period. Additional configuration or control signaling, e.g. dynamic signaling (e.g., control signaling like DCI or using an uplink grant) may indicate which timing structure to use. This may be seen as configuring the UE with a transient configuration, e.g. with different messages indicating the multiple timing structures and indicating which one to use for a specific occasion. A transient configuration may be considered to indicate one or more transient protection intervals, and/or to comprise an indicator indicating one out of more than one (e.g., predefined or configured or configurable) transient protection intervals to use for transmitting the first and/or second signaling, respectively to insert between such, and/or before a (second) signaling.

If a UE transmits UL1 and UL2, no explicit signaling is needed, as the UE may implicitly know it should insert an extra guard period since it transmits both UL1 and UL2. Another UE only transmitting UL1 or UL2 would however may need an explicit indication, in particular for transmitting signaling not beginning in the first symbol of a transmission timing structure like a slot. This explicit indication could either be included in the uplink grant itself, or on a common channel (such as the group common PDCCH discussed of NR). If the explicit indication is transmitted in the uplink grant it could be preferable to always include this indicator (even if UE transmits UL1 and UL2) to avoid extra blind decoding when decoding PDCCH.

Thus, additionally or alternatively to the above, there may be considered a method of operating a (configuring) radio node in a radio access network. The method comprises configuring a user equipment (or, more generally, a second radio node) with a transient compensation configuration, the transient compensation configuration indicating a transient compensation interval to be inserted in time domain before signaling to be transmitted by the user equipment (or second radio node). The signaling may be second signaling as described herein. The transient compensation configuration and/or interval may be determined based on a transient protection interval or configuration, which may have been determined and/or configured to the user equipment/second radio node, or for a different second radio node or user equipment. In some cases, the transient compensation interval may be identical in duration to the transient protection interval. However, different timing advance and/or distance and/or operation conditions may be considered when determining the compensation interval, such that it does not have to be equal to the transient interval in all cases. In addition, there is disclosed a (configuring) radio node for a radio access network. The radio node is adapted for configuring a user equipment (or second radio node) with a transient compensation configuration as described herein. The (configuring) radio node may comprise, and/or be adapted for utilising, processing circuitry and/or radio circuitry, in particular a transceiver and/or transmitter, for such configuring. Alternatively, or additionally, it may comprise a configuring module for such configuring. The (configuring) radio node may be a radio node as described herein, and/or be a radio node provided with the transient configuration or transient protection interval based on which the transient compensation configuration is determined and/or configured. There may also be considered a second radio node or user equipment for a RAN, which may be adapted for transmitting signaling based on a transient compensation configuration as described herein. Moreover, a method of operating a second radio node or user equipment in a RAN may be considered, wherein the method may comprise transmitting signaling based on a transient compensation configuration as described herein.

Figure 6:
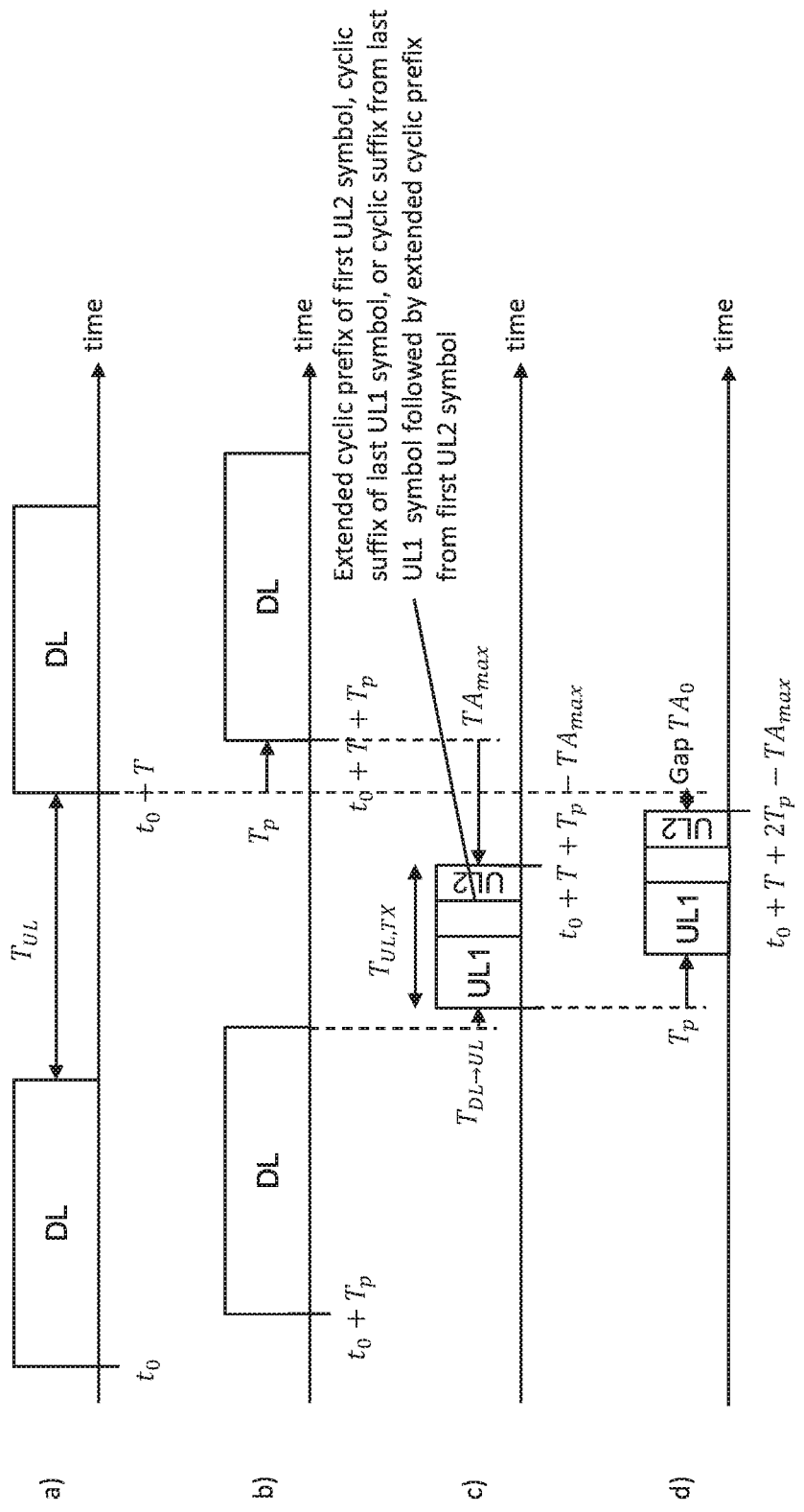
FIG. 6, showing another exemplary transmission timing scenarios including an extra guard period with transient signaling.

Inserting the transient protection interval, e.g. extra guard period, may require, and/or comprise, and/or be based on, a larger uplink gap $T_{UL}$ or shorter uplink transmission duration $T_{UL,TX}$ being configured and/or considered, e.g. when the associated timing advance may become too large. It may be considered the responsibility of the network (radio node or network node, for example) to keep track of this and/or to configure/signal to the UE a longer downlink gap duration $T_{UL}$ or shorter uplink transmission $T_{UL,TX}$ (e.g., by shortening UL1 and/or UL2). The transient configuration may thus be considered to indicate a shortened duration for the first or second signaling, e.g. shorter than scheduled. The transient configuration may be considered to override scheduling in this regard, in particular if the scheduling is provided with a different message than an indication regarding shortened duration for such signaling or uplink transmission in general. In this context, it may be considered that scheduling may pertain to a different duration than uplink transmission duration. For example, an uplink transmission duration may represent a time interval (period) generally allowable for uplink transmission, whereas scheduled interval may be included therein, but do not have to fill it out or reach to its end in time domain. Uplink transmission duration may in some cases represent the transmission period, or generally a period that may be longer than a scheduled duration, and/or a transmission timing structure. Actually scheduled signaling may only needed to be shortened if it reaches the end of such a period. Generally, instead of inserting a (silent or empty) extra guard period, the same time duration could be filled with an extended cyclic prefix from the next symbol (i.e. cyclic prefix of first symbol of UL2 is extended), or a cyclic suffix of the last preceding symbol (i.e. a cyclic suffix is added to the last symbol of UL1), or a mix of both option. This is illustrated in FIG. 6. It may be envisioned to fill this extra guard period with a predefined filler sequence (as an example of a signaling pattern). An extended cyclic prefix or a predefined sequence using same frequency allocation and power as UL2 may be used. The extra guard period (transient protection interval) may be considered to capture most parts of the transient period, it is therefore beneficial to either leave the extra guard period unmodulated or fill it with a signal that has physical properties (one or more characteristics of a third set, such as power, frequency location, bandwidth) similar to, or corresponding to e.g., UL2.

In particular, FIG. 6 shows a case in which the transient protection interval, respectively the extra guard period, between uplink transmissions UL1 and UL2 comprises a signaling sequence, which may be considered to represent a pattern and/or modulated signaling.

So far the case has been described of two transmissions UL1 and UL2 and one extra guard period. However, this concept can easily be generalized to more uplink transmissions and extra guard periods or transient protection intervals, which may be the same in duration, or different, e.g. depending on the differences of set of characteristics between successive signaling instances, e.g. between each signaling instance and the signaling instance directly before in time.

In an alternative view on the approaches described so far, it may be considered a UE (or second radio node) may be configured with multiple timing advance values for example per carrier, e.g. one for each signaling or type of signaling, e.g. uplink physical channel/signal. A type may comprise one or more different signalings and/or pertain to one or more different channels, e.g. in a group, for example based on duration. For example, signalings of the same duration or within a range of durations, or above or below a threshold duration, may be grouped together to represent a type of signaling in this context, e.g. based on duration in number of symbols. For each group there may be configured one timing advance value, e.g. by the transient configuration. It may be considered that signalings, e.g. uplink physical channels/signals, can be grouped to have one timing advance value per uplink physical channel/signal group, in particular that signaling like uplink physical channel/signal in the same group share the same timing advance value.

Figure 7:
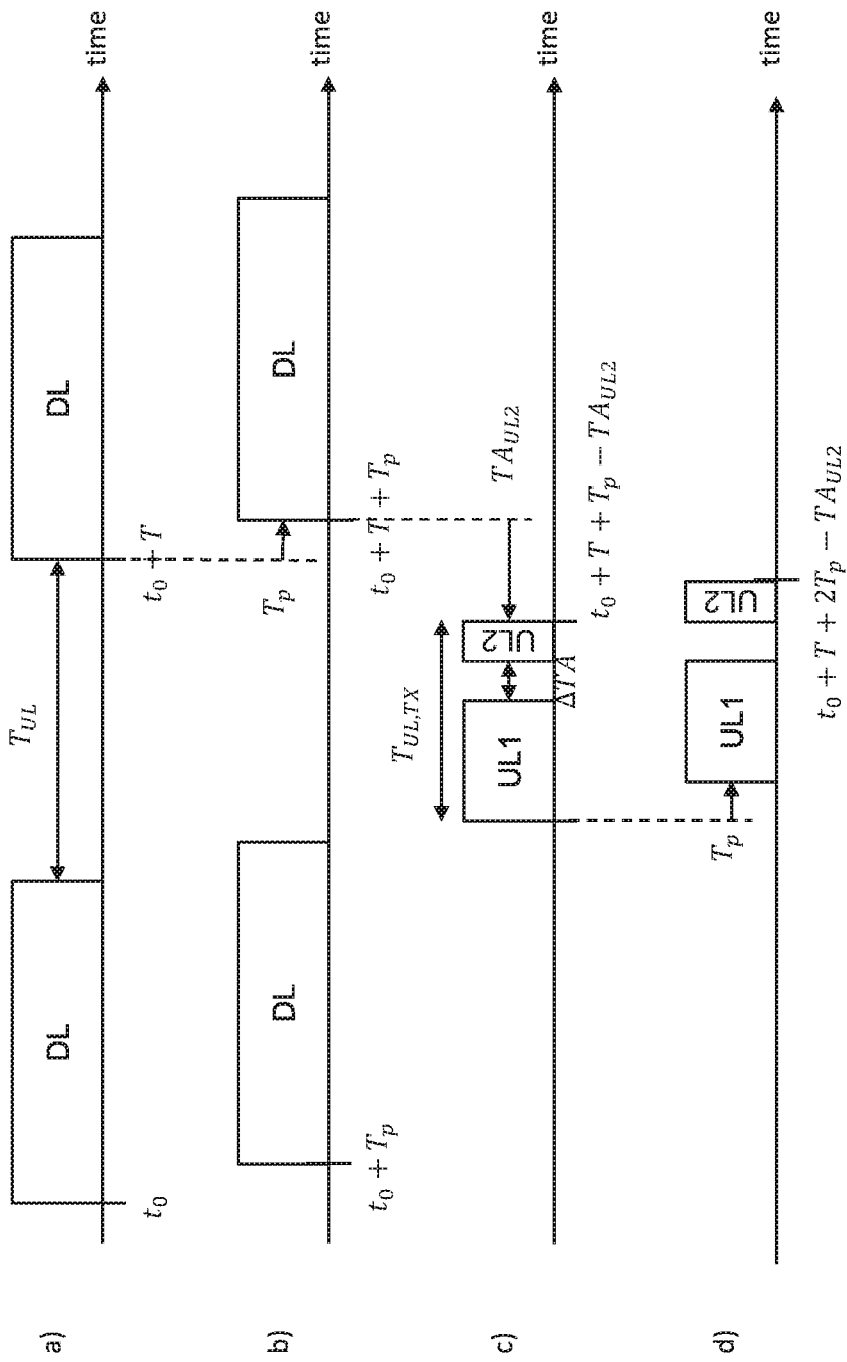
FIG. 7, showing another exemplary transmission timing scenarios including an extra guard period and adapted signaling duration.

FIG. 7 illustrates UL2 being transmitted with a timing advance value $TA_{UL2}$, while UL1 is transmitted using timing advance $TA_{UL1}=TA_{UL2}+\Delta TA$. The value $\Delta TA$ may be at least as large as a minimum required duration of the extra guard period. $\Delta TA$ may be considered to represent a transient protection interval.

In particular, FIG. 7 shows a physical channel/signal UL2 being transmitted using timing advance value $TA_{UL2}$. The physical channel/signal UL1 is transmitted with $TA_{UL1}>TA_{UL2}$, the difference $TA_{UL2}-TA_{UL1}$ represents an extra guard period between UL1 and UL2.

Figure 8:
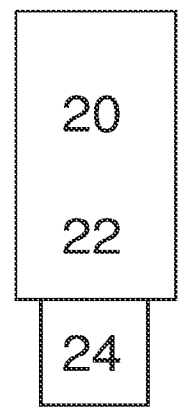
FIG. 8, schematically showing an exemplary radio node implemented as a user equipment.

FIG. 8 schematically shows a radio node, in particular a terminal or wireless device 10, which may in particular be implemented as a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules.

Figure 9:
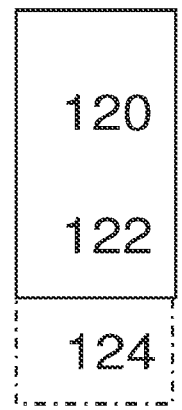
FIG. 9, schematically showing an exemplary radio node implemented as a network node.

FIG. 9 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification.

Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules. The radio node 100 may generally comprise communication circuitry, e.g. for communication with another network node, like a radio node, and/or with a core network and/or an internet or local net, in particular with an information system, which may provide information and/or data to be transmitted to a user equipment.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4 symbols. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

Signal strength may be represented by power or power level, and/or energy or energy level, and/or amplitude, respectively a distribution thereof, e.g. a distribution over time, for example over a transmission timing structure or interval like a slot or mini-slot, or a time interval associated to signaling of the signal strength, e.g. one or more symbols. Signal strength may be represented absolutely and/or relatively, and/or based on a peak indication or total strength, e.g. total power.

Reference signaling may be signaling comprising one or more reference symbols and/or structures. Reference signaling may be adapted for gauging and/or estimating and/or representing transmission conditions, e.g. channel conditions and/or transmission path conditions and/or channel (or signal or transmission) quality. It may be considered that the transmission characteristics (e.g., signal strength and/or form and/or modulation and/or timing) of reference signaling are available for both transmitter and receiver of the signaling (e.g., due to being predefined and/or configured or configurable and/or being communicated). Different types of reference signaling may be considered, e.g. pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or signal strength related, e.g. power-related or energy-related or amplitude-related (e.g., SRS or pilot signaling) and/or phase-related, etc.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling may be considered one alternative).

A radio node may generally be considered a device or node adapted for wireless and/or radio (and/or microwave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or other node, in particular for a RAN as described herein.

The terms wireless device, user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, a RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of uplink control information, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parameterization with one or more parameters, and/or one or more index or indices, and/or one or more bit patterns representing the information. It may in particular be considered that control signaling as described herein, based on the utilised resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A border symbol may generally represent a starting symbol or an ending symbol for transmitting and/or receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising microwave and/or millimeter and/or other frequencies, in particular between 100 MHz or 1 GHz, and 100 GHz or 20 or 10 GHz. Such communication may utilise one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. a LTE-based standard and/or NR. A sidelink may utilise TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilising a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be send over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A configuration or schedule, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

A control region of a transmission timing structure may be an interval in time for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time.

The duration of a symbol (symbol time length or interval) of the transmission timing structure may generally be dependent on a numerology and/or carrier, wherein the numerology and/or carrier may be configurable. The numerology may be the numerology to be used for the scheduled transmission.

Scheduling a device, or for a device, and/or related transmission or signaling, may be considered comprising, or being a form of, configuring the device with resources, and/or of indicating to the device resources, e.g. to use for communicating. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g. in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbols. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH.

In the context of this disclosure, there may be distinguished between dynamically scheduled or aperiodic transmission and/or configuration, and semi-static or semi-persistent or periodic transmission and/or configuration. The term "dynamic" or similar terms may generally pertain to configuration/transmission valid and/or scheduled and/or configured for (relatively) short timescales and/or a (e.g., predefined and/or configured and/or limited and/or definite) number of occurrences and/or transmission timing structures, e.g. one or more transmission timing structures like slots or slot aggregations, and/or for one or more (e.g., specific number) of transmission/occurrences. Dynamic configuration may be based on low-level signaling, e.g. control signaling on the physical layer and/or MAC layer, in particular in the form of DCI or SCI. Periodic/semi-static may pertain to longer timescales, e.g. several slots and/or more than one frame, and/or a non-defined number of occurrences, e.g., until a dynamic configuration contradicts, or until a new periodic configuration arrives.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

Feedback signaling may be considered a form or control signaling, e.g. uplink or sidelink control signaling, like UCI (Uplink Control Information) signaling or SCI (Sidelink Control Information) signaling. Feedback signaling may in particular comprise and/or represent acknowledgement signaling and/or acknowledgement information and/or measurement reporting.

Acknowledgement information may comprise an indication of a specific value or state for an acknowledgement signaling process, e.g. ACK or NACK or DTX. Such an indication may for example represent a bit or bit value or bit pattern or an information switch. Different levels of acknowledgement information, e.g. providing differentiated information about quality of reception and/or error position in received data element/s may be considered and/or represented by control signaling. Acknowledgment information may generally indicate acknowledgment or non-acknowledgment or non-reception or different levels thereof, e.g. representing ACK or NACK or DTX. Acknowledgment information may pertain to one acknowledgement signaling process. Acknowledgement signaling may comprise acknowledgement information pertaining to one or more acknowledgement signaling processes, in particular one or more HARQ or ARQ processes. It may be considered that to each acknowledgment signaling process the acknowledgement information pertains to, a specific number of bits of the information size of the control signaling is assigned. Measurement reporting signaling may comprise measurement information.

Signaling may generally comprise one or more symbols and/or signals and/or messages. A signal may comprise and/or represent one or more bits, which may be modulated into a common modulated signal. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different acknowledgement signaling processes, e.g. representing and/or pertaining to one or more such processes. An indication may comprise signaling and/or a plurality of signals and/or messages and/or may be comprised therein, which may be transmitted on different carriers and/or be associated to different acknowledgement signaling processes, e.g. representing and/or pertaining to one or more such processes.

Signaling utilising, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g. time and/or frequency. The resource elements of a substructure may be scheduled for associated signaling.

It should generally be noted that the number of bits or a bit rate associated to specific signaling that can be carried on a resource element may be based on a modulation and coding scheme (MCS). Thus, bits or a bit rate may be seen as a form of resources representing a resource structure or range in frequency and/or time, e.g. depending on MCS. The MCS may be configured or configurable, e.g. by control signaling, e.g. DCI or MAC (Medium Access Control) or RRC (Radio Resource Control) signaling.

Different formats of for control information may be considered, e.g. different formats for a control channel like a Physical Uplink Control Channel (PUCCH). PUCCH may carry control information or corresponding control signaling, e.g. Uplink Control Information (UCI). UCI may comprise feedback signaling, and/or acknowledgement signaling like HARQ feedback (ACK/NACK), and/or measurement information signaling, e.g. comprising Channel Quality Information (CQI), and/or Scheduling Request (SR) signaling. One of the supported PUCCH formats may be short, and may e.g. occur at the end of a slot interval, and/or multiplexed and/or neighboring to PUSCH. Similar control information may be provided on a sidelink, e.g. as Sidelink Control Information (SCI), in particular on a (physical) sidelink control channel, like a (P)SCCH.

A code block may be considered a subelement of a data element like a transport block, e.g., a transport block may comprise a one or a plurality of code blocks.

A scheduling assignment may be configured with control signaling, e.g. downlink control signaling or sidelink control signaling. Such controls signaling may be considered to represent and/or comprise scheduling signaling, which may indicate scheduling information. A scheduling assignment may be considered scheduling information indicating scheduling of signaling/transmission of signaling, in particular pertaining to signaling received or to be received by the device configured with the scheduling assignment. It may be considered that a scheduling assignment may indicate data (e.g., data block or element and/or channel and/or data stream) and/or an (associated) acknowledgement signaling process and/or resource/s on which the data (or, in some cases, reference signaling) is to be received and/or indicate resource/s for associated feedback signaling, and/or a feedback resource range on which associated feedback signaling is to be transmitted. Transmission associated to an acknowledgement signaling process, and/or the associated resources or resource structure, may be configured and/or scheduled, for example by a scheduling assignment. Different scheduling assignments may be associated to different acknowledgement signaling processes. A scheduling assignment may be considered an example of downlink control information or signaling, e.g. if transmitted by a network node and/or provided on downlink (or sidelink control information if transmitted using a sidelink and/or by a user equipment).

A scheduling grant (e.g., uplink grant) may represent control signaling (e.g., downlink control information/signaling). It may be considered that a scheduling grant configures the signaling resource range and/or resources for uplink (or sidelink) signaling, in particular uplink control signaling and/or feedback signaling, e.g. acknowledgement signaling. Configuring the signaling resource range and/or resources may comprise configuring or scheduling it for transmission by the configured radio node. A scheduling grant may indicate a channel and/or possible channels to be used/ usable for the feedback signaling, in particular whether a shared channel like a PUSCH may be used/is to be used. A scheduling grant may generally indicate uplink resource/s and/or an uplink channel and/or a format for control information pertaining to associated scheduling assignments. Both grant and assignment/s may be considered (downlink or sidelink) control information, and/or be associated to, and/or transmitted with, different messages.

A resource structure in frequency domain (which may be referred to as frequency interval and/or range) may be represented by a subcarrier grouping. A subcarrier grouping may comprise one or more subcarriers, each of which may represent a specific frequency interval, and/or bandwidth. The bandwidth of a subcarrier, the length of the interval in frequency domain, may be determined by the subcarrier spacing and/or numerology. The subcarriers may be arranged such that each subcarrier neighbours at least one other subcarrier of the grouping in frequency space (for grouping sizes larger than 1). The subcarriers of a grouping may be associated to the same carrier, e.g. configurably or configured of predefined. A physical resource block may be considered representative of a grouping (in frequency domain). A subcarrier grouping may be considered to be associated to a specific channel and/or type of signaling, it transmission for such channel or signaling is scheduled and/or transmitted and/or intended and/or configured for at least one, or a plurality, or all subcarriers in the grouping. Such association may be time-dependent, e.g. configured or configurable or predefined, and/or dynamic or semi-static. The association may be different for different devices, e.g. configured or configurable or predefined, and/or dynamic or semi-static. Patterns of subcarrier groupings may be considered, which may comprise one or more subcarrier groupings (which may be associated to same or different signalings/channels), and/or one or more groupings without associated signaling (e.g., as seen from a specific device). An example of a pattern is a comb, for which between pairs of groupings associated to the same signaling/channel there are arranged one or more groupings associated to one or more different channels and/or signaling types, and/or one or more groupings without associated channel/signaling).

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

| Abbreviation | Explanation |
| --- | --- |
| ARQ | Automatic Repeat reQuest |
| CBG | Code Block Group |
| CDM | Code Division Multiplex |
| CQI | Channel Quality Information |
| CRC | Cyclic Redundancy Check |
| CRS | Common reference signal |
| CSI | Channel State Information |
| CSI-RS | Channel state information reference signal |
| DAI | Downlink Assignment Indicator |
| DCI | Downlink Control Information |
| DFT | Discrete Fourier Transform |
| DMRS | Demodulation reference signal |
| FDM | Frequency Division Multiplex |
| HARQ | Hybrid Automatic Repeat Request |
| MCS | Modulation and Coding Scheme |
| MIMO | Multiple-input-multiple-output |
| MRC | Maximum-ratio combining |
| MRT | Maximum-ratio transmission |
| MU-MIMO | Multiuser multiple-input-multiple-output |
| OFDM/A | Orthogonal Frequency Division Multiplex/Multiple Access |
| PAPR | Peak to Average Power Ratio |
| PDCCH | Physical Downlink Control Channel |
| PDSCH | Physical Downlink Shared Channel |
| PRACH | Physical Random Access Channel |
| PRB | Physical Resource Block |
| PUCCH | Physical Uplink Control Channel |
| PUSCH | Physical Uplink Shared Channel |
| (P)SCCH | (Physical) Sidelink Control Channel |
| (P)SSCH | (Physical) Sidelink Shared Channel |
| RRC | Radio Resource Control |
| SC-FDM/A | Single Carrier Frequency Division Multiplex/Multiple Access |
| SCI | Sidelink Control Information |
| SINR | Signal-to-interference-plus-noise ratio |
| SIR | Signal-to-interference ratio |

-continued

| Abbreviation | Explanation |
| --- | --- |
| SNR | Signal-to-noise-ratio |
| SR | Scheduling Request |
| SRS | Sounding Reference Signal(ing) |
| SVD | Singular-value decomposition |
| TDM | Time Division Multiplex |
| UCI | Uplink Control Information |
| UE | User Equipment |
| URLLC | Ultra Low Latency High Reliability Communication |
| VL-MIMO | Very-large multiple-input-multiple-output |
| ZF | Zero Forcing |

Abbreviations may be considered to follow 3GPP usage if applicable.

The invention claimed is:

1. A method of operating a user equipment in a radio access network, the method comprising:
transmitting, during a transmission period, first signaling having a first set of transmission characteristics, and second signaling having second set of transmission characteristics, the first set differing from the second set, the transmitting comprising including a transient protection interval in time domain between the first signaling and the second signaling and the first and second set of transmission characteristics respectively comprising a transmission strength, the first set of transmission characteristics differing from the second set of transmission characteristics in transmission strength and the signaling of the transient protection interval associated to a third set of transmission characteristics at least partly corresponding to the second set of transmission characteristics, the correspondence between the second set of transmission characteristics and the third set of transmission characteristics being at least one of a signal strength, bandwidth, frequency and channel.

2. The method according to claim 1, wherein the transient protection interval is a silent interval or an interval filled with transient signaling.

3. The method according to claim 1, wherein the first set differs from the second set in at least one of duration of signaling, channel, channel type, transmission and/or allocated bandwidth.

4. The method according to claim 1, wherein the transient protection interval accommodates for circuitry switching time for switching between the first signaling and the second signaling.

5. The method according to claim 1, wherein a duration of second signaling is shorter than a duration of the first signaling.

6. The method according to claim 1, wherein the transmission period is neighbored by two downlink transmission timing structures.

7. The method according to claim 1, wherein the transmission period is represented by, and/or is included in a transmission timing structure, and or crosses two transmission timing structures, wherein a transmission timing structure in particular may be a slot.

8. The method according to claim 1, wherein the second signaling has a duration covering N symbol time intervals, N being smaller than 7, in particular smaller than 5, or smaller than 3.

9. The method according to claim 1, wherein a transient configuration is configured utilizing control signaling, for example dedicated signaling or broadcast/multicast.

10. The method according to claim 1, wherein the transient protection interval is a low-level interval, a ramping interval or a cyclic interval.

11. A user equipment for a radio access network, the user equipment comprising:
processing circuitry configured for:
transmitting, during a transmission period, first signaling having a first set of transmission characteristics, and second signaling having second set of transmission characteristics, the first set differing from the second set, the transmitting comprising including a transient protection interval in time domain between the first signaling and the second signaling and the first and second set of transmission characteristics respectively comprising a transmission strength, the first set of transmission characteristics differing from the second set of transmission characteristics in transmission strength and the signaling of the transient protection interval associated to a third set of transmission characteristics at least partly corresponding to the second set of transmission characteristics, the correspondence between the second set of transmission characteristics and the third set of transmission characteristics being at least one of a signal strength, bandwidth, frequency and channel.

12. A method of operating a radio node in a radio access network, the method comprising:
configuring a user equipment with a transient configuration, the transient configuration indicating a transient protection interval to be inserted in time domain between first signaling and second signaling to be transmitted by the user equipment, the first signaling having a first set of transmission characteristics, and the second signaling having a second set of transmission characteristics, the first set differing from the second set and the first and second set of transmission characteristics respectively comprising a transmission strength, the first set of transmission characteristics differing from the second set of transmission characteristics in transmission strength and the signaling of the transient protection interval associated to a third set of transmission characteristics at least partly corresponding to the second set of transmission characteristics, the correspondence between the second set of transmission characteristics and the third set of transmission characteristics being at least one of a signal strength, bandwidth, frequency and channel.

13. A radio node for a radio access network, the radio node comprising processing circuitry configured for configuring a user equipment with a transient configuration, the transient configuration indicating a transient protection interval to be inserted in time domain between first signaling and second signaling to be transmitted by the user equipment, the first signaling having a first set of transmission characteristics, and the second signaling having a second set of transmission characteristics, the first set differing from the second set and the first and second set of transmission characteristics respectively comprising a transmission strength, the first set of transmission characteristics differing from the second set of transmission characteristics in transmission strength and the signaling of the transient protection interval associated to a third set of transmission characteristics at least partly corresponding to the second set of transmission characteristics, the correspondence between the second set of transmission characteristics and the third set of transmission characteristics being at least one of a signal strength, bandwidth, frequency and channel.

* * * * *